(12) United States Patent
Weber

(10) Patent No.: US 9,008,307 B2
(45) Date of Patent: *Apr. 14, 2015

(54) SYSTEM AND METHOD FOR DELIVERING SATELLITE SERVICES AT MULTIPLE SECURITY LEVELS

(71) Applicant: Thomson Licensing, Issy de Moulineaux (FR)

(72) Inventor: Barry Jay Weber, Carmel, IN (US)

(73) Assignee: Thomson Licensing, Issy les Moulineaux (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/153,300

(22) Filed: Jan. 13, 2014

(65) Prior Publication Data

US 2014/0237504 A1 Aug. 21, 2014

Related U.S. Application Data

(63) Continuation of application No. 11/794,750, filed as application No. PCT/US2005/038751 on Oct. 26, 2005, now Pat. No. 8,666,071.

(51) Int. Cl.
*H04N 7/167* (2011.01)
*H04N 21/4408* (2011.01)
(Continued)

(52) U.S. Cl.
CPC ........... *H04N 21/4408* (2013.01); *H04H 20/82* (2013.01); *H04H 40/90* (2013.01);
(Continued)

(58) Field of Classification Search
CPC ............... H04L 9/08; H04L 29/06659; H04L 29/06687; G06F 21/10; H04N 7/1675; H04N 21/4405; H04N 21/2347; H04N 21/434; H04N 7/163; H04N 21/4104; H04N 21/42623; H04N 7/167; H04N 21/2389; H04N 21/23895; H04N 21/4408
USPC ............. 380/271, 200–202, 210, 212, 37, 42; 725/25, 31; 713/163, 150, 166
See application file for complete search history.

(56) References Cited

U.S. PATENT DOCUMENTS 5,935,248 A 8/1999 Kuroda
6,134,419 A 10/2000 Williams
(Continued)

FOREIGN PATENT DOCUMENTS

DE 10244079 4/2004
EP 1511316 3/2005
(Continued)

OTHER PUBLICATIONS

Harrison, C., et al., "SMPTE Conditional Access DC28.4 Working Document," ISO/IECJTC1/SC29/WG11, Jul. 2001, 80 pgs., XP002341986.
(Continued)

*Primary Examiner* — Nirav B Patel
(74) *Attorney, Agent, or Firm* — Robert D. Shedd; Vincent E. Duffy; Michael A. Pugel

(57) ABSTRACT

The disclosed embodiments relate to a system and method for delivering satellite services at multiple security levels. More specifically, there is provided a method comprising determining a level of security supported by a first set top box (22a), encoding a first IP packet containing a satellite service using the level of security supported by the first set top box (22a), transmitting the first IP encoded packet to the first set top box (22a), determining a level of security supported by a second set top box (22b), wherein the level of security supported by the second set top box (22b) is different from the level of security of the first set top box (22a), encoding a second IP packet containing a satellite service using the level of security supported by the second set top box (22b); and transmitting the second encoded IP packet to the second set top box (22b).

44 Claims, 3 Drawing Sheets

(51) Int. Cl.

| | | |
|---|---|---|
| *H04H 20/82* | (2008.01) | |
| *H04H 40/90* | (2008.01) | |
| *H04H 60/23* | (2008.01) | |
| *H04L 29/06* | (2006.01) | |
| *H04N 7/20* | (2006.01) | |
| *H04N 21/214* | (2011.01) | |
| *H04N 21/2389* | (2011.01) | |
| *H04N 21/258* | (2011.01) | |
| *H04N 21/2662* | (2011.01) | |
| *H04N 21/61* | (2011.01) | |
| *H04N 21/63* | (2011.01) | |
| *H04N 21/6405* | (2011.01) | |
| *H04N 21/643* | (2011.01) | |
| *H04N 21/647* | (2011.01) | |
| *H04L 12/18* | (2006.01) | |
| *G06F 21/10* | (2013.01) | |
| *H04N 21/2347* | (2011.01) | |

(52) U.S. Cl.
CPC ............ *H04H 60/23* (2013.01); *H04L 12/189* (2013.01); *H04L 63/0428* (2013.01); *H04L 63/105* (2013.01); *H04N 7/167* (2013.01); *H04N 7/20* (2013.01); *H04N 21/2143* (2013.01); *H04N 21/23895* (2013.01); *H04N 21/25808* (2013.01); *H04N 21/2662* (2013.01); *H04N 21/6143* (2013.01); *H04N 21/631* (2013.01); *H04N 21/6405* (2013.01); *H04N 21/64322* (2013.01); *H04N 21/64707* (2013.01); *G06F 21/10* (2013.01); *H04L 29/06659* (2013.01); *H04L 29/06687* (2013.01); *H04N 21/2347* (2013.01); *H04N 21/2389* (2013.01)

(56) References Cited

U.S. PATENT DOCUMENTS

| | | | |
|---|---|---|---|
| 6,240,183 B1 | 5/2001 | Marchant | |
| 7,010,681 B1 | 3/2006 | Fletcher et al. | |
| 7,443,983 B2 | 10/2008 | Tanizawa et al. | |
| 7,607,022 B1 * | 10/2009 | Qiu et al. | 713/189 |
| 7,644,266 B2 | 1/2010 | Ahuja et al. | |
| 7,916,755 B2 * | 3/2011 | Hasek et al. | 370/486 |
| 2001/0047422 A1 | 11/2001 | McTernan et al. | |
| 2002/0048275 A1 | 4/2002 | Atwater et al. | |
| 2002/0196939 A1 | 12/2002 | Unger et al. | |
| 2003/0145329 A1 * | 7/2003 | Candelore | 725/87 |
| 2003/0219127 A1 | 11/2003 | Russ et al. | |
| 2004/0064688 A1 * | 4/2004 | Jacobs | 713/150 |
| 2004/0101138 A1 | 5/2004 | Revital et al. | |
| 2004/0136533 A1 | 7/2004 | Takagaki et al. | |
| 2004/0240466 A1 | 12/2004 | Unitt et al. | |
| 2005/0028011 A1 | 2/2005 | Motoyoshi et al. | |
| 2005/0117743 A1 | 6/2005 | Bender et al. | |
| 2005/0141704 A1 | 6/2005 | Van Der Veen | |
| 2005/0154921 A1 | 7/2005 | Medvinsky | |
| 2005/0169473 A1 | 8/2005 | Candelore | |
| 2006/0047957 A1 | 3/2006 | Helms et al. | |
| 2006/0191002 A1 | 8/2006 | Lee et al. | |
| 2006/0245589 A1 | 11/2006 | Pinder | |

FOREIGN PATENT DOCUMENTS

| | | |
|---|---|---|
| JP | 200019959 | 1/2000 |
| JP | 200210229 | 1/2002 |
| WO | WO0209429 | 1/2002 |
| WO | WO02086725 | 10/2002 |
| WO | WO2004084445 | 9/2004 |
| WO | WO2006027749 | 3/2006 |

OTHER PUBLICATIONS

Mittra, S. "IOLUS: A Framework for Scaleable Secure Multicasting," Computer Communication Review, ACT, New York, US vol. 27, No. 4, Sep. 14, 1997, pp. 1-12, XP002931671.

* cited by examiner

SYSTEM AND METHOD FOR DELIVERING SATELLITE SERVICES AT MULTIPLE SECURITY LEVELS

This application is a continuation of applicant's co-pending U.S. application Ser. No. 11/794,750, filed on Jul. 3, 2007 which claims the benefit under U.S.C. §365 of International Application PCT/US2005/038751, filed on Oct. 26, 2005.

FIELD OF THE INVENTION

The present invention relates generally to transmitting video or other services data over a network. More specifically, the present invention relates to a system for delivering satellite services at multiple security levels.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

As most people are aware, satellite television systems, such as DirecTV, have become much more widespread over the past few years. In fact, since the introduction of DirecTV in 1994, more than twelve million American homes have become satellite TV subscribers. Most of these subscribers live in single-family homes where satellite dishes are relatively easy to install and connect. For example, the satellite dish may be installed on the roof of the house.

Many potential subscribers, however, live or temporarily reside in multi-dwelling units ("MDUs"), such as hotels or high-rise apartment buildings. Unfortunately, there are additional challenges involved with providing satellite TV services to the individual dwelling units within an MDU. It may be impractical and/or extremely expensive to provide and connect one satellite dish per dwelling. For example, in a high-rise apartment building with one thousand apartments, it may be impractical to mount one thousand satellite dishes on the roof of the building. Some conventional systems have avoided these issues by converting the digital satellite television signal into an analog signal that can be transmitted via a single coaxial cable to a plurality of dwellings. These systems, however, offer limited channels, have reduced quality compared to all-digital systems, and cannot provide the satellite TV experience that users who live in single family homes are accustomed.

An improved system and/or method for providing satellite TV to a multi-dwelling unit is desirable.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for delivering satellite services at multiple security levels. More specifically, there is provided a method comprising determining a level of security supported by a first set top box (22a), encoding a first IP packet containing a satellite service using the level of security supported by the first set top box (22a), transmitting the first IP encoded packet to the first set top box (22a), determining a level of security supported by a second set top box (22b), wherein the level of security supported by the second set top box (22b) is different from the level of security of the first set top box (22a), encoding a second IP packet containing a satellite service using the level of security supported by the second set top box (22b); and transmitting the second encoded IP packet to the second set top box (22b).

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below.

In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
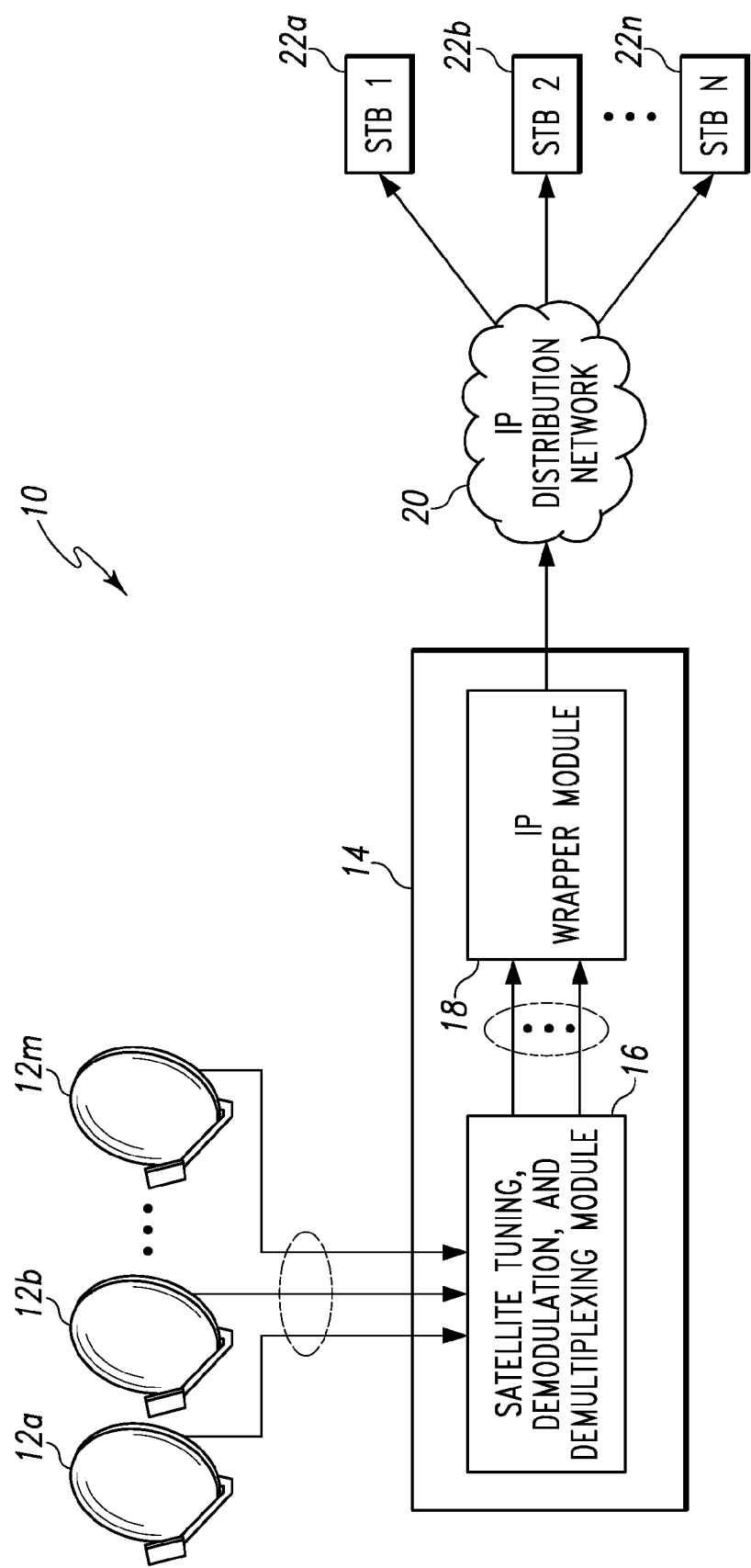
FIG. 1 is a block diagram of an exemplary satellite television over IP system in accordance with one embodiment of the present invention.

Turning to FIG. 1, a block diagram of an exemplary satellite television over IP system in accordance with one embodiment is illustrated and generally designated by a reference numeral 10. As illustrated, in one embodiment, the system 10 may include one or more satellite dishes 12a through 12m, a head-end unit, such as a satellite gateway 14, an IP distribution network 20, and one or more set top boxes ("STBs") 22a through 22n. Those of ordinary skill in the art, however, will appreciate that the embodiment of the system 10 illustrated in FIG. 1 is merely one potential embodiment of the system 10. As such, in alternate embodiments, the illustrated components of the system 10 may be rearranged or omitted or additional components may be added to the system 10. For example, with minor modifications, the system 10 may configured to distributed non-satellite video and audio services.

The satellite dishes 12a-12m may be configured to receive video, audio, or other types of television-related data that is transmitted from satellites orbiting the earth. As will be described further below, in one embodiment the satellite dishes 12a-12m are configured to receive DirecTV programming over KU band from 10.7 to 12.75 Gigahertz ("GHz"). In alternate embodiments, however, the satellite dishes 12a-12m may be configured to receive other types of direct broadcast satellites ("DBS") or television receive-only ("TVRO") signal, such as Dish Network signals, ExpressVu signals, Star- Choice signals, and the like. In still other non-satellite based systems, the satellite dishes 12a-12m may be omitted from the system 10.

In one embodiment, a low noise-block converter ("LNC") within the satellite dishes 12a-12m receives the incoming signal from the earth-orbiting satellite and converts these incoming signals to a frequency in the L band between 950 and 2150 Megahertz ("MHz"). As will be described in further detail below with regard to FIG. 2, each of the satellites 12a-12m may be configured to receive one or more incoming satellite TV signals on a particular frequency (referred to as a transponder) and with a particular polarization and to convert these satellite signals to L band signals, each of which may contain a plurality of video or audio signals.

The satellite dishes 12a-12m may be configured to transmit the L band signals to a head-end unit or gateway server, such as the satellite gateway 14. In alternate, non-satellite embodiments, the head-end unit may be a cable television receiver, a high definition television receiver, or other video distribution system The satellite gateway 14 includes a satellite tuning, demodulating, and demultiplexing module 16 and an IP wrapper module 18. The module 16 may contain a plurality of tuners, demodulators, and demultiplexers to convert the modulated and multiplexed L band signals transmitted from the satellites 12a-12m into a plurality single program transport streams ("SPTS"), each of which carries a service (e.g., television channel video, television channel audio, program guides, and so forth). In one embodiment, the module 16 is configured to produce a single program transport stream for all of the services received by the satellite dishes 12a-12m. In an alternate embodiment, however, the module 16 may produce transport streams for only a subset of the services received by the satellite dishes 12a-12m.

The satellite tuning, demodulating, and demultiplexing module 16 may transmit the SPTS to the IP wrapper module 18. In one embodiment, the IP wrapper module 18 repackages the data within the SPTS into a plurality of internet protocol ("IP") packets suitable for transmission over the IP distribution network 20. For example, the IP wrapper module 18 may convert DirecTV protocol packets within the SPTS into IP packets. In addition, the IP wrapper module 18 may be configured to receive server requests from the STBs 22a-22n and to multicast (i.e., broadcast to one or more of the STBs 22a-22n over an IP address) the IP SPTS to those STBs 22a-22n that had requested the particular service.

In an alternative embodiment, the IP wrapper module 18 may also be configured to multicast IP protocol SPTS for services not requested by one of the STBs 22a-22n. It should be noted that the modules 16 and 18 are merely one exemplary embodiment of the satellite gateway 14. In alternate embodiments, such as the one described below in regard to FIGS. 2 and 3, the functions of the modules 16 and 18 may be redistributed or consolidated amongst a variety of suitable components or modules.

The IP distribution network 20 may include one or more routers, switches, modem, splitters, or bridges. For example, in one embodiment, the satellite gateway 14 may be coupled to a master distribution frame ("MDF") that is coupled to an intermediate distribution frame ("IDF") that is coupled to a coax to Ethernet bridge that is coupled to a router that is coupled to one or more of the STBs 22a-22n. In another embodiment, the IP distribution network 20 may be an MDF that is coupled to a Digital Subscriber Line Access Multiplexer ("DSLAM") that is coupled to a DSL modem that is coupled to a router. In yet another embodiment, the IP distribution network may include a wireless network, such as 802.11 or WiMax network. In this type of embodiment, the STBs 22a-22n may include a wireless receiver configured to receive the multicast IP packets. Those of ordinary skill in the art will appreciate that the above-described embodiments are merely exemplary. As such in alternate embodiments, a large number of suitable forms of IP distribution networks may be employed in the system 10.

The IP distribution network 20 may be coupled to one or more STBs 22a-22n. The STBs 22a-22n may be any suitable type of video, audio, and/or other data receiver capable of receiving IP packets, such as the IP SPTS, over the IP distribution network 20. It will be appreciated the term set top box ("STB"), as used herein, may encompass not only devices that sit upon televisions. Rather the STBs 22a-22n may be any suitable form of video or audio receiver, whether internal or external to a television, display, or computer, that can be configured to function as described herein—including, but not limited to a video components, computers, wireless telephones, or other forms video recorder. In one embodiment, the STBs 22a-22n may be a DirecTV receiver configured to receive services, such as video and/or audio, through an Ethernet port (amongst other inputs). In alternate embodiments, the STBs 22a-22n may be designed and/or configured to receive the multicast transmission over coaxial cable, twisted pair, copper wire, or through the air via a wireless standard, such as the I.E.E.E. 802.11 standard.

Figure 2:
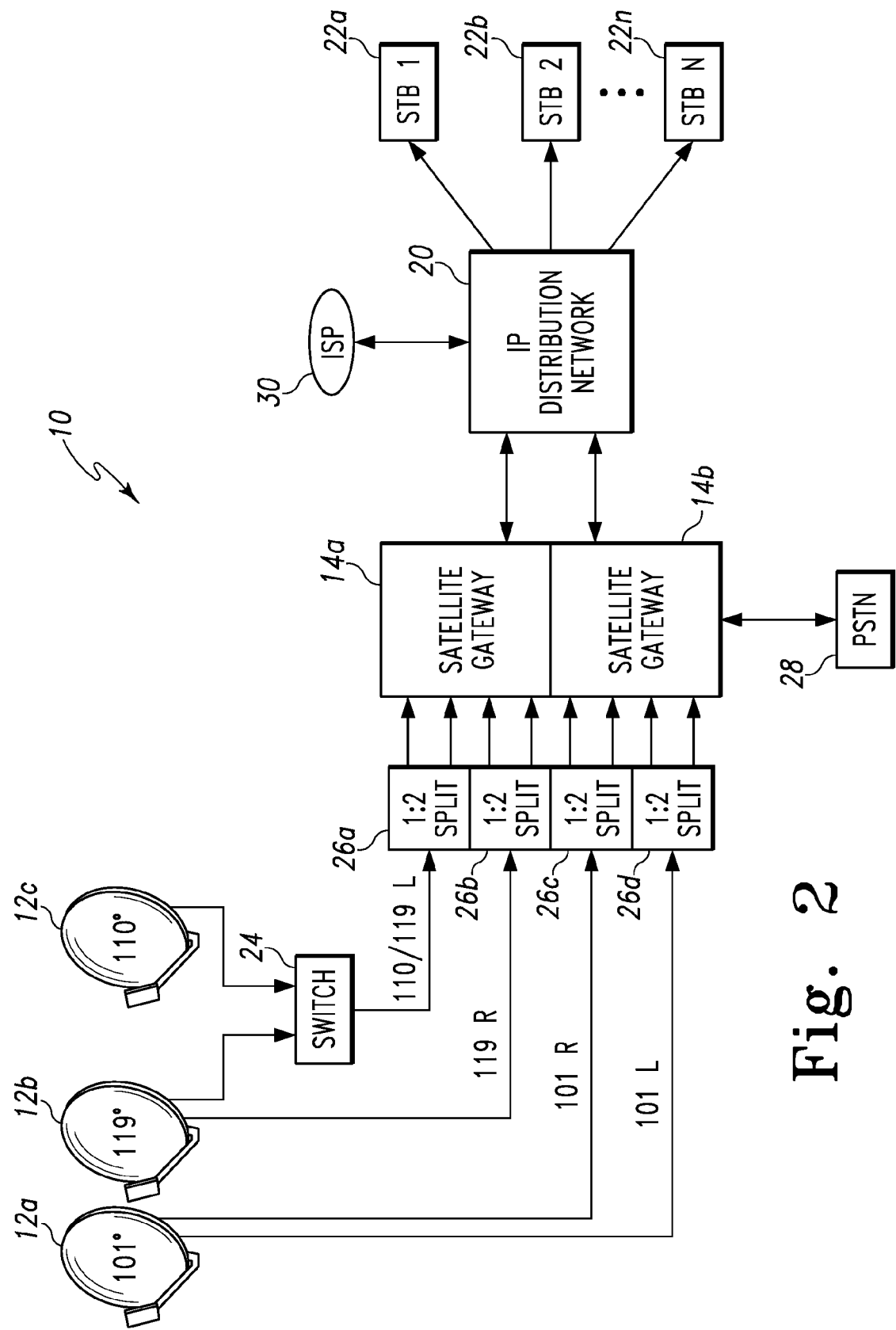
FIG. 2 is another embodiment of the exemplary satellite television over IP system illustrated in FIG.

As discussed above, the system 10 may receive video, audio, and/or other data transmitted by satellites in space and process/convert this data for distribution over the IP distribution network 20. Accordingly, FIG. 2 is another embodiment of the exemplary satellite television over IP system 10 in accordance with one embodiment. FIG. 2 illustrates three exemplary satellite dishes 12a-12c. Each of the satellite dishes 12a-12c may be configured to receive signals from one or more of the orbiting satellites. Those of ordinary skill will appreciate that the satellites and the signals that are transmitted from the satellites are often referred to by the orbital slots in which the satellites reside. For example, the satellite dish 12a is configured to receive signals from a DirecTV satellite disposed in an orbital slot of 101 degrees. Likewise, the satellite dish 12b receives signals from a satellite disposed at 119 degrees, and the satellite dish 12c receives signals from a satellite disposed at orbital slot of 110 degrees. It will be appreciated that in alternate embodiments, the satellite dishes 12a-12c may receive signals from a plurality of other satellites disclosed in a variety of orbital slots, such as the 95 degree orbital slot. In addition, the satellite dishes 12a-12c may also be configured to receive polarized satellite signals. For example, in FIG. 2, the satellite dish 12a is configured to receive signals that are both left polarized (illustrated in the figure as "101 L") and right polarized (illustrated as "101 R").

As described above in regard to FIG. 1, the satellite dishes 12a-12c may receive satellite signals in the KU band and convert these signals into L band signals that are transmitted to the satellite gateway 14. In some embodiments, however, the L band signals produced by the satellite dishes 12a-12c may be merged into fewer signals or split into more signals prior to reaching the satellite gateway 14. For example, as illustrated in FIG. 2, L band signals from the satellite dishes 12b and 12c may be merged by a switch 24 into a single L band signal containing L band signals from both the satellite at 110 degrees and the satellite at 119 degrees.

As illustrated, the system 10 may also include a plurality of 1:2 splitters 26a, 26b, 26c, and 26d to divide the L band signals transmitted from the satellite dishes 12a-12c into two L band signals, each of which include half of the services of the pre-split L band signal. In alternate embodiments, the 1:2 splitters 26a-26b may be omitted or integrated into the satellite gateways 14a and 14b.

The newly split L band signals may be transmitted from the 1:2 splitters 26a-26d into the satellite gateways 14a and 14b. The embodiment of the system 10 illustrated in FIG. 2 includes two of the satellite gateways 14a and 14b. In alternate embodiments, however, the system 10 may include any suitable number of satellite gateways 14. For example, in one embodiment, the system may include three satellite gateways 14.

The satellite gateways 14a and 14b may then further subdivide the L band signals and then tune to one or more services on the L band signal to produce one or more SPTS that may be repackaged into IP packets and multicast over the IP distribution network 20. In addition, one or more of the satellite gateways 14a, 14b may also be coupled to a public switch telephone network ("PSTN") 28. Because the satellite gateways 14a, b are coupled to the PSTN 28, the STBs 22a-22n may be able to communicate with a satellite service provider through the IP distribution network 20 and the satellite gateways 14a, b. This functionality may advantageously eliminate the need to have each individual STBs 22a-22n coupled directly to the PSTN 28.

The IP distribution network 20 may also be coupled to an internet service provider ("ISP") 30. In one embodiment, the IP distribution network 20 may be employed to provide internet services, such as high-speed data access, to the STBs 22a-22n and/or other suitable devices (not shown) that are coupled to the IP distribution network 20.

Figure 3:
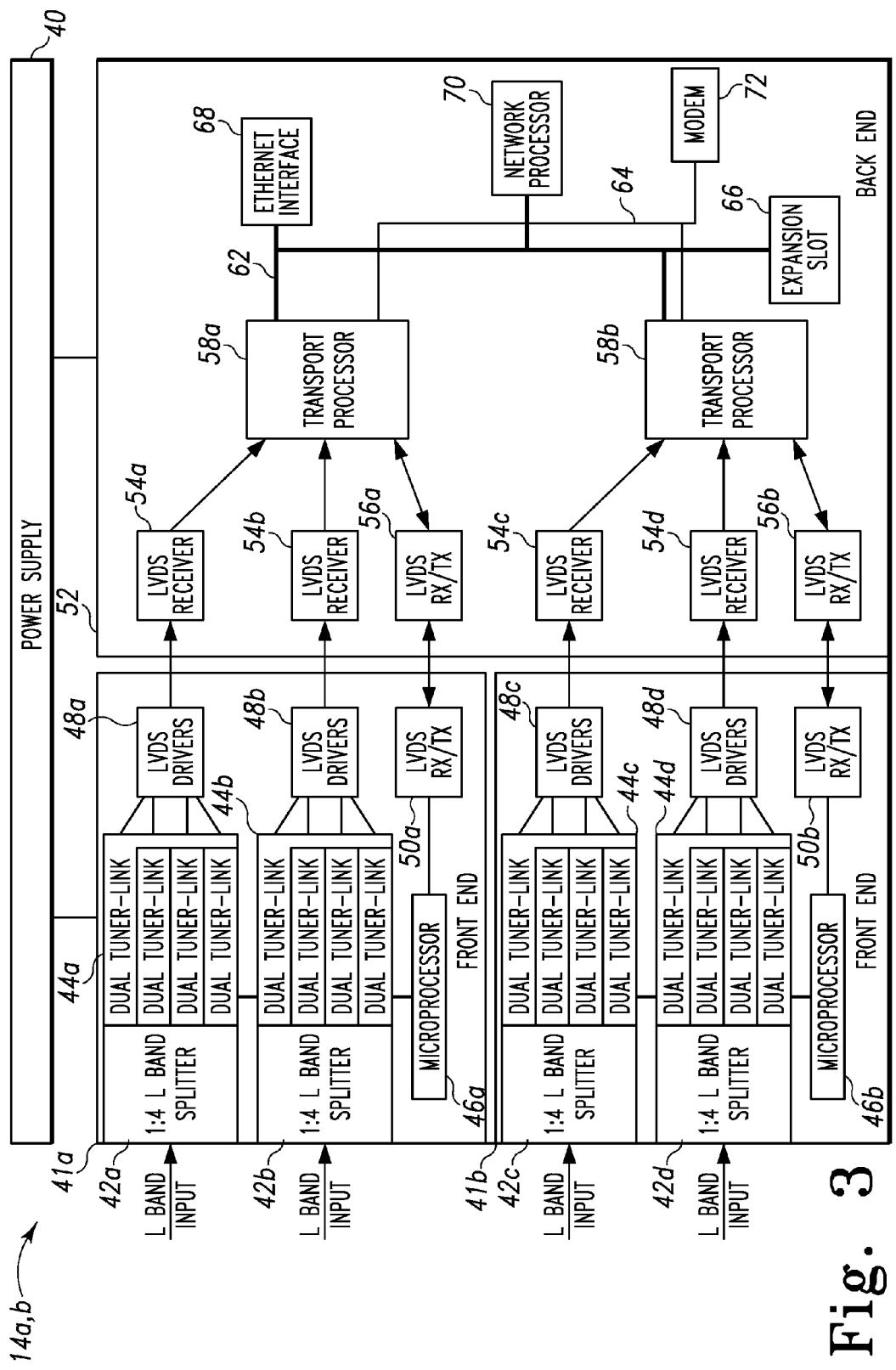
FIG. 3 is a block diagram of an exemplary satellite gateway of the present invention.

As described above, the satellite gateways 14a, b may be configured to receive the plurality of L band signals, to produce a plurality of SPTS, and to multicast requested SPTS over the IP distribution network 20. Referring now to FIG. 3, a block diagram of an exemplary satellite gateway 14 is shown. As illustrated, the satellite gateway 14a, b includes a power supply 40, two front-ends 41a and 41b and a back-end 52. The power supply 40 may be any one of a number of industry-standard AC or DC power supplies configurable to enable the front-ends 41a, b and the back-end 52 to perform the functions described below.

The satellite gateway 14a, b may also include two front-ends 41a, b. In one embodiment, each of the front-ends, 41a, b may be configured to receive two L band signal inputs from the 1:2 splitters 26a-26d that were described above in regards to FIG. 2. For example, the front-end 41a may receive two L band signals from the 1:2 splitter 26a and the front-end 41b may receive two L band signals from the 1:2 splitter 26b. In one embodiment, each of the L band inputs into the front-end 41a, b includes eight or fewer services.

The front-ends 41a, b may then further sub-divide the L band inputs using 1:4 L band splitters 42a, 42b, 42c, and 42d. Once subdivided, the L band signals may pass into four banks 44a, 44b, 44c, and 44d of dual tuner links. Each of the dual tuner links within the banks 44a-44d may be configured to tune to two services within the L band signals received by that individual dual tuner links to produce SPTS. Each of the dual tuner links may then transmit the SPTS to one of the low-voltage differential signaling ("LVDS") drivers 48a, 48b, 48c, and 48d. The LVDS drivers 48a-48d may be configured to amplify the transport signals for transmission to the back-end 52. In alternate embodiments, different forms of differential drivers and/or amplifiers may be employed in place of the LVDS drivers 48a-48d. Other embodiments may employ serialization of all of the transport signals together for routing to the back end 52.

As illustrated, the front-ends 41a, b may also include microprocessors 46a and 46b. In one embodiment, the microprocessors 46a, b may control and/or relay commands to the banks 44a-44d of dual tuner links and the 1:4 L band splitters 42a-42d. The microprocessors 46a, b may comprise ST10 microprocessors produce by ST Microelectronics. The microprocessors 46a, b may be coupled to LVDS receiver and transmitter modules 50a and 50b. The LVDS receiver/transmitter modules 50a, b may facilitate communications between the microprocessors 46a, b and components on the back-end 52, as will be described further below.

Turning next to the back-end 52, the back-end 52 includes LVDS receivers 54a, 54b, 54c, and 54d, which are configured to receive transport stream signals transmitted by the LVDS drivers 48a-48d. The back-end 52 also includes LVDS receiver/transmitter modules 56a and 56b which are configured to communicate with the LVDS receiver/transmitter modules 50a, b.

As illustrated, the LVDS receivers 54a-54d and the LVDS receiver/transmitters 56a, b are configured to communicate with transport processors 58a and 58b. In one embodiment, the transport processors 58a, b are configured to receive the SPTS produced by the dual tuner links in the front-ends 41a, b. For example, in one embodiment, the transport processors 58a, b may be configured to produce 16 SPTS. The transport processors 58a, b may be configured to repack the SPTS into IP packets which can be multicast over the IP distribution network 20. For example, the transport processors 58a, b may repackage DirecTV protocol packets into IP protocol packets and then multicast these IP packets on an IP address to one or more of the STBs 22a-22n.

The transport processors 58a, b may also be coupled to a bus 62, such as a 32 bit, 66 MHz peripheral component interconnect ("PCI") bus. Through the bus 62, the transport processors 58a, b may communicate with a network processor 70, an Ethernet interface 84, and/or an expansion slot 66. The network processor 70 may be configured to receive requests for services from the STBs 22a-22n and to direct the transport processors 58a, b to multicast the requested services. In one embodiment, the network processor is an IXP425 network processor produced by Intel. While not illustrated, the network processor 70 may also be configured to transmit status data to a front panel of the satellite gateway 14a,b or to support debugging or monitoring of the satellite gateway 14a, b through debug ports.

As illustrated, the transport processors 58a, b may also be coupled to the Ethernet interface 68 via the bus 62. In one embodiment, the Ethernet interface 68 is a gigabit Ethernet interface that provides either a copper wire or fiber-optic interface to the IP distribution network 20. In addition, the bus 62 may also be coupled to an expansion slot, such as a PCI expansion slot to enable the upgrade or expansion of the satellite gateway 14a, b.

The transport processors 58a, b may also be coupled to a host bus 64. In one embodiment, the host bus 64 is a 16-bit data bus that connects the transport processors 58a, b to a modem 72, which may be configured to communicate over the PSTN 28, as described above. In alternate embodiments, the modem 72 may also be coupled to the bus 62.

As described above, the satellite gateway 14 may transmit the IP packets across the IP distribution network 20 to the STBs 22a-22n. In one embodiment, the satellite gateway 14 is configured to transmit IP packets using two or more levels of security (e.g., encryption) depending on the capabilities of each of the STBs 22a-22n. More specifically, the satellite gateway 14 may be configured to multicast satellite services to each one of the STBs 22a-22n at a security level supported by that particular STB. For example, if an STB operating at a lower level of security (i.e., less encryption), requests a particular satellite service (CNN, for example), the satellite gateway 14 may generate a multicast of CNN with the IP packets in the multicast encrypted at the lower security level. If, at the same time, another one of the STBs 22a-22n operating at a higher level of security (i.e., more encryption) also requests to receive CNN, the satellite gateway 14 may generate another multicast of CNN using the higher level of security. In one embodiment, the satellite gateway 14 may be configured to generate three different levels of security: network encryption, network encryption plus partial advanced encryption standard ("AES"), and network encryption plus full AES encryption (128-bit key encryption). In alternate embodiments, however, alternate encryption techniques or security schemes may be employed.

As stated above, the satellite gateway 14 may be configured to generate different multicasts to the STBs 22a-22n depending on the security capabilities supported by each of the STBs 22a-22n. In one embodiment, the satellite gateway 14 is configured to request the security capabilities supported by each of the STBs 22a-22n when that particular STB is coupled (via the IP distribution network 20) to the satellite gateway 14. In this embodiment, the satellite gateway 14 may store the security capabilities of each of the STBs 22a-22n and access these stored security capabilities when one of the STBs 22a-22n requests satellite services from the satellite gateway 14. In another embodiment, the satellite gateway 14 may look at the hardware and/or software characteristics of a particular one of the STBs 22a-22n when that particular STB requests satellite services from the satellite gateway 14. In yet another embodiment, the satellite gateway 14 may be configured to query the requesting STB 22a-22n about its security capabilities.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed:

1. A method comprising:
   determining a first level of security supported by a device responsive to a request from the device;
   encoding a signal received from an audio video service provider into first IP packets using the determined first level of security supported by the device, wherein said first IP packets contain data from said audio video service provider that has been encoded using the determined first level of security supported by the first device and wherein encoding is performed after determining the first level of security and continues as further data is received from said audio video service provider;
   transmitting the first IP encoded packets to at least the first device;
   determining a second level of security supported by a second device responsive to a request from the second device;
   responsive to a determination that the second level of security supported by the second device is different from the first level of security supported by the first device, encoding a signal received from said audio video service provider into second IP packets using the determined second level of security supported by the second device, wherein said second IP packets contain data from said media delivery service that has been encoded using the determined second level of security supported by the second device and wherein said encoding is performed after determining the second level of security supported by the second device and continues as further data is received from said audio video service provider; and
   transmitting the second encoded IP packets to at least the second device while the first device continues receiving the first encoded IP packets.

2. The method of claim 1, wherein determining the level of security supported by the second device comprises determining that the second device supports network encryption.

3. The method of claim 1, wherein determining the level of security supported by the second device comprises determining that the second device supports partial 128-bit encryption.

4. The method of claim 1, wherein determining the level of security supported by the first device comprises determining that the first device supports full 128-bit encryption.

5. The method of claim 1, wherein the first device has a level of security that is less than the level of security of the second device.

6. The method of claim 1, wherein the first device is a set top box.

7. The method of claim 6, wherein the second device is at least one of a video display device, video recorder, computer, and telephone device.

8. The method of claim 1, wherein encoding the first IP packet comprises encoding an IP packet containing data from a digital satellite service.

9. The method of claim 1, wherein encoding a signal received from a audio video service provider into first IP packets and the step of encoding a signal received from said audio video service provider into second IP packets use the same data.

10. The method of claim 1, wherein the first IP packets are formed into a multicast that can be received by a plurality of first devices having the first level of security and the second IP packets are formed into a multicast that can be received by a plurality of second device having the second level of security.

11. The method of claim 1, wherein the determining a first level of security, the encoding a signal received from an audio video service provider into first IP packets, the determining a second level of security, and the encoding a signal received from said audio video service provider into second IP packets are performed by at least one of a network processor and a transport processor.

12. An apparatus, comprising:
   a processing circuit that determines a first level of security supported by a device responsive to a request from the device and to determine a second level of security supported by a second device responsive to a request from the second device,
   the processing circuit further encoding a signal received from an audio video service provider into first IP packets using the determined first level of security supported by the device, wherein said first IP packets contain data from said audio video service provider that has been encoded using the determined first level of security supported by the first device and wherein encoding is performed after determining the first level of security and continues as further data is received from said audio video service provider, the processing circuit, responsive to a determination that the second level of security supported by the second device is different from the first level of security supported by the first device, further encoding a signal received from said audio video service provider into second IP packets using the determined second level of security supported by the second device, wherein said second IP packets contain data from said media delivery service that has been encoded using the determined second level of security supported by the second device and wherein said encoding is performed after determining the second level of security supported by the second device and continues as further data is received from said audio video service provider; and a network interface coupled to the processing circuit, the network interface transmitting the first IP encoded packets to at least the first device and transmitting the second encoded IP packets to the second device while the first device continues receiving the first encoded IP packets.

13. The apparatus of claim 12, wherein the processing circuit further determines if the second device supports network encryption.

14. The apparatus of claim 12, wherein the processing circuit further determines if the second device supports partial 128-bit encryption.

15. The apparatus of claim 12, wherein the processing circuit further determines if the first set top box supports full 128-bit encryption.

16. The apparatus of claim 12, wherein the processing circuit includes a network processor and a transport processor.

17. The apparatus of claim 12, wherein the first device has a level of security that is less than the level of security of the second device.

18. The apparatus of claim 12, wherein the first device is a set top box.

19. The apparatus of claim 18, wherein the second device is at least one of a video display device, video recorder, computer, and telephone device.

20. The apparatus of claim 12, wherein the processing circuit further encodes the first IP packets with data from a digital satellite service.

21. The apparatus of claim 12, wherein the data from said audio video service provider that has been encoded using the determined first level of security supported by the first device is the same as the data from said audio video service provider that has been encoded using the determined second level of security supported by the second device.

22. The apparatus of claim 12, wherein the first IP packets are formed into a multicast that can be received by a plurality of first devices having the first level of security and the second IP packets are formed into a multicast that can be received by a plurality of second device having the second level of security.

23. An apparatus, comprising:
processing means for determining a first level of security supported by a device responsive to a request from the device;
processing means for encoding a signal received from an audio video service provider into first IP packets using the determined first level of security supported by the device, wherein said first IP packets contain data from said audio video service provider that has been encoded using the determined first level of security supported by the first device and wherein encoding is performed after determining the first level of security and continues as further data is received from said audio video service provider;
network interface means for transmitting the first IP encoded packets to at least the first device;
processing means for determining a second level of security supported by a second device responsive to a request from the second device;
processing means for, responsive to a determination that the second level of security supported by the second device is different from the first level of security supported by the first device, encoding a signal received from said audio video service provider into second IP packets using the determined second level of security supported by the second device, wherein said second IP packets contain data from said media delivery service that has been encoded using the determined second level of security supported by the second device and wherein said encoding is performed after determining the second level of security supported by the second device and continues as further data is received from said audio video service provider; and
network interface means for transmitting the second encoded IP packets to at least the second device while the first device continues receiving the first encoded IP packets.

24. The apparatus of claim 23, wherein the processing means for determining the level of security supported by the second device comprises determining that the second device supports network encryption.

25. The apparatus of claim 23, wherein the processing means for determining the level of security supported by the second device comprises determining that the second device supports partial 128-bit encryption.

26. The apparatus of claim 23, wherein the processing means for determining the level of security supported by the first device comprises determining that the first device supports full 128-bit encryption.

27. The apparatus of claim 23, wherein the first device has a level of security that is less than the level of security of the second device.

28. The apparatus of claim 23, wherein the first device is a set top box.

29. The apparatus of claim 28, wherein the second device is at least one of a video display device, video recorder, computer, and telephone device.

30. The apparatus of claim 23, wherein the processing means for encoding the first IP packet comprises encoding an IP packet containing data from a digital satellite service.

31. The apparatus of claim 23, wherein the processing means for encoding a signal received from an audio video service provider into first IP packets and the step of encoding a signal received from said audio video service provider into second IP packets use the same data.

32. The apparatus of claim 23, wherein the first IP packets are formed into a multicast that can be received by a plurality of first devices having the first level of security and the second IP packets are formed into a multicast that can be received by a plurality of second device having the second level of security.

33. The apparatus of claim 23, wherein the processing means includes at least one of a network processor and a transport processor.

34. An apparatus, comprising:
a processor configured to determine a first level of security supported by a device responsive to a request from the device and to determine a second level of security supported by a second device responsive to a request from the second device, the processor further configured to encode a signal received from an audio video service provider into first IP packets using the determined first level of security supported by the device, wherein said first IP packets contain data from said audio video service provider that has been encoded using the determined first level of security supported by the first device and wherein encoding is performed after determining the first level of security and continues as further data is received from said audio video service provider, the processor, responsive to a determination that the second level of security supported by the second device is different from the first level of security supported by the first device, further configured to encode a signal received from said audio video service provider into second IP packets using the determined second level of security supported by the second device, wherein said second IP packets contain data from said media delivery service that has been encoded using the determined second level of security supported by the second device and wherein said encoding is performed after determining the second level of security supported by the second device and continues as further data is received from said audio video service provider; and a network interface coupled to the processor, the network interface transmitting the first IP encoded packets to at least the first device and transmitting the second encoded IP packets to the second device while the first device continues receiving the first encoded IP packets.

35. The apparatus of claim 34, wherein the processor is further configured to determine if the second device supports network encryption.

36. The apparatus of claim 34, wherein the processor determines if the second device supports partial 128-bit encryption.

37. The apparatus of claim 34, wherein the processor is further configured to determine if the first set top box supports full 128-bit encryption.

38. The apparatus of claim 34, wherein the processor comprises a network processor and a transport processor.

39. The apparatus of claim 34, wherein the first device has a level of security that is less than the level of security of the second device.

40. The apparatus of claim 34, wherein the first device is a set top box.

41. The apparatus of claim 40, wherein the second device is at least one of a video display device, video recorder, computer, and telephone device.

42. The apparatus of claim 34, wherein the processor is further configured to encode the first IP packets with data from a digital satellite service.

43. The apparatus of claim 34, wherein the data from said audio video service provider that has been encoded using the determined first level of security supported by the first device is the same as the data from said audio video service provider that has been encoded using the determined second level of security supported by the second device.

44. The apparatus of claim 34, wherein the first IP packets are formed into a multicast that can be received by a plurality of first devices having the first level of security and the second IP packets are formed into a multicast that can be received by a plurality of second device having the second level of security.

* * * * *